United States Patent [19]

O'Brien et al.

[11] 3,740,707
[45] June 19, 1973

[54] FAR FIELD SIGNAL SIMULATION UTILIZING CYLINDRICAL ARRAYS

[75] Inventors: Paul J. O'Brien; Harold F. Messias, both of Scituate, Mass.

[73] Assignee: The United States of America as represented by the Secretary of the Navy, Washington, D.C.

[22] Filed: June 15, 1971

[21] Appl. No.: 154,240

[52] U.S. Cl. ................................................... 340/9
[51] Int. Cl. ............................................ H04b 13/00
[58] Field of Search ....................... 340/5, 6, 6 S, 8, 340/9

[56] References Cited
UNITED STATES PATENTS

| | | | |
|---|---|---|---|
| 3,364,461 | 1/1968 | Trott | 340/6 S |
| 2,925,581 | 2/1960 | Hackley et al. | 340/5 R |
| 3,368,190 | 2/1968 | Wilson et al. | 340/6 S |
| 3,585,579 | 6/1971 | Dorr | 340/9 |

*Primary Examiner*—Benjamin A. Borchelt
*Assistant Examiner*—H. J. Tudor
*Attorney*—R. S. Sciascia and Thomas O. Watson, Jr.

[57] ABSTRACT

A performance monitoring test set having a cylindrical near field multi-stave transducer array which simulates far field conditions. The multi-stave array is housed in a cylindrical test tank with appropriate shading and phasing of the staves to produce a constant pressure volume in the near field. The test tank system permits testing of a sonar system's range and bearing accuracy, beam uniformity, minimum detectable signal level and transmitter response.

6 Claims, 3 Drawing Figures

INVENTORS
J. O'BRIEN
F. MESSIAS
BY Thomas O. Watson Jr.

ATTORNEY

FAR FIELD SIGNAL SIMULATION UTILIZING CYLINDRICAL ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a system for monitoring the performance characteristics of sonar systems. It has the unique advantages of providing a detailed analysis of the sonar system status while in a static operating condition, (e.g. actual test site installation, aboard ship).

In the past sonar system performance has been tested by two different means. In one type of system, signals were pre-recorded and played back through the sonar system to simulate the actions of a real target. The system provides artificial, electrically generated simulation and does not adequately measure performance characteristics under actual operational acoustic conditions.

Another prior art system for determining the performance of a sonar system compares the response of a standard reference channel with the response of the sonar system under test to a sound generated at a distance great enough to produce planar waves at the respective receiving hydrophones. The disadvantages of this system is that it requires long test distances as well as elaborate calibration test sites. As a result, an expensive "downtime" of the system is necessary.

To measure a sonar transducer in the near-field a test array must be provided which will produce a constant pressure volume at the desired frequencies over the active face of the sonar transducer under test. W. J. Trott in U.S. Pat. No. 3,393,400 dicloses a method and apparatus for creating a constant pressure plane wave under near field conditions by the use of a planar transducer array. A technique is disclosed for determining the shading and phasing required for producing such a wave front and a method for using such a planar array to calibrate a transducer. The present invention utilizes this concept to produce the performance monitoring test system which simulates actual operational acoustic conditions without the attendant disadvantages mentioned previously.

SUMMARY OF THE INVENTION

The general purpose of the present invention is to provide a system in which all transducer parameters can be measured in the near field by simulation of far field conditions. Far field conditions are simulated by a cylindrically configured array of a plurality of small omni-directional transducer elements, each of which is smaller than a wavelength, spaced close together which when energized produce a constant pressure volume in the near-field. The array provides an accurate measure of beam uniformity, minimum detectable signal level, transmitter response and range and bearing accuracy. The cylindrical array obviates the need for long test distances, elaborate calibration test sites and extensive "downtime" of a sonar system.

OBJECTS OF THE INVENTION

A primary object of the present invention is to provide a test system which accurately measures the operating parameters of a sonar system.

Another object is to simulate far field conditions in the near field region.

A further object is to provide a transducer array which produces a near field pressure distribution which is constant.

Still another object is to provide a sonar performance monitoring test set which closely approximates actual operational acoustic conditions.

A still further object is to provide a sonar performance monitoring test set considerably reduced in test system complexity.

Other objects and advantages will become readily apparant from the following detailed description of the invention when considered in conjunction with the drawings.

DETAILED DESCRIPTION OF THE PREFERRED EMBODIMENT

To measure any transducer in the near-field, a test array must be designed which will provide a constant pressure volume at the desired frequencies and over the active face f the transducer under test. The design parameters of this array are, therefore, the operating frequency range and the test dimensions of the transducer under test. Also, the transducer elements which make up the measuring array should be spaced a sufficient distance apart so that the test array will in effect be acoustically transparent over the entire operating frequency range. The minimum constant pressure volume developed by the array is obtained at the lower frequency limit. This imposes the minimum size requirements on the array. The maximum spacing of the individual elements in the array for adequate support of the sound field is 0.8 $\lambda$. Where $\lambda$ is the wavelength of the operating frequency. This requirement determines the minimum number of elements which must be used in the array.

Figure 1:
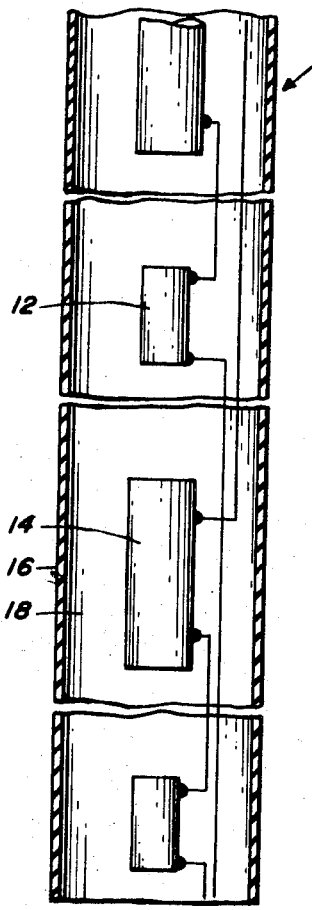
FIG. 1 shows a typical stave assembly for use in the cylindrical array.

Referring now to FIG. 1 there is shown a typical stave assembly 10 for use in the cylindrical test array. The assembly is comprised of a plurality of small ceramic transducer elements 12 spaced a predetermined distance apart. The transducer elements may, for example, be PZT–4 ceramic cylinders sealed with glass to metal end caps. The element to element spacing as well as element size is selected to assure that the array is acoustically transparent at the operating frequency. The transducer elements are connected in parallel with appropriate amplitude shading elements 14 respectively coupled in series with the parallel energized elements. The amplitude shading was accomplished with capacitors and etching of the element conductive surface as is known in the art.

The stave 16 itself is a hollow neoprene tube substantially larger in diameter than the transducer and shading elements. the parallel-connected transducer and shading elements are inserted in the tube which is evacuated, filled with oil 18 and capped at each end.

The test array consists of a plurality of staves equally spaced on a circle of predetermined diameter. The diameter of the circle is preselected to provide a cylindrical array which is acoustically transparent at the operating frequency.

A typical array of the present invention constructed for testing an AN/AQS-10 sonar system consisted of 24 staves equally spaced on a 25 inch diameter circle, parallel to one another and concentrically arranged about the AN AQS-10 hydrophone. This resulted in a 4 inch stand-off distance between the test array and the AN-/AQS-10 hydrophone. The staves are horizontally shaded and connected in parallel to form the test array. A set of 10 adjacent staves will be in operation at any one time.

Each stave of the test array for the AN/AQS-10 contains 19 small ceramic transducer elements spaced 4 inches apart for a total of 456 elements in the array. The transducer elements are PZT-4 ceramic cylinders measuring one-half inch by one-fourth inch. The element to element spacing, as well as the element size, assure transparency of the array at an operating frequency of 10kHz.

Figure 2:
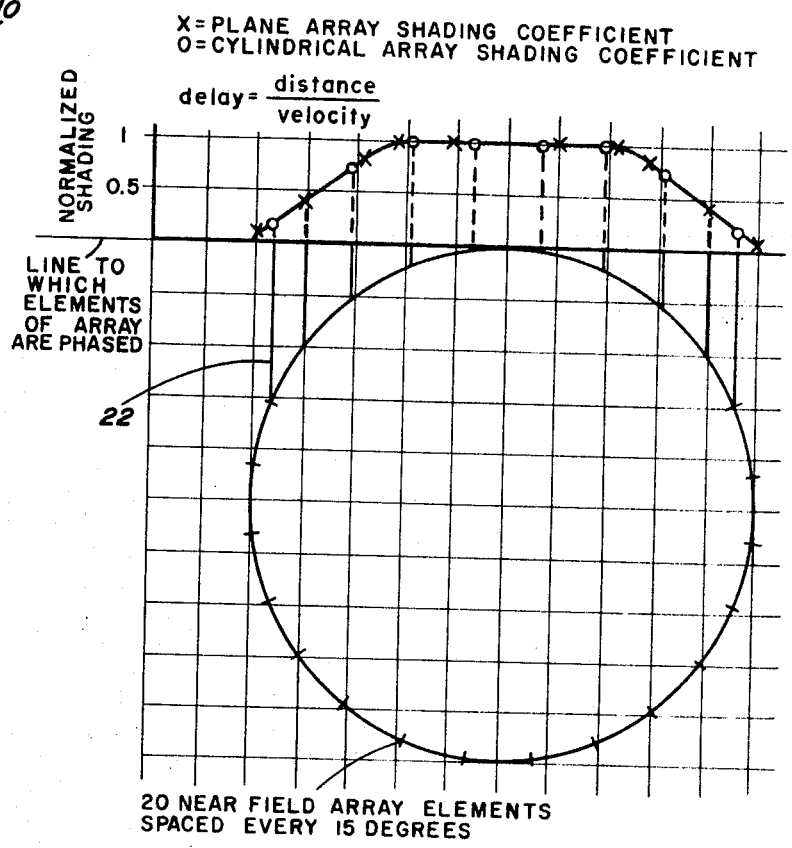
FIG. 2 represents the shading function and the phasing of a 10 element section of a stave cylindrical array.

FIG. 2 presents the shading function used for the AN-/AQS-10 test array. The relative position of each stave in the array is indicated at 20. The horizontal and vertical shading coefficients for the cylindrical test array were derived by projecting the relative stave position in the array on to a modified Gaussian shading function which is obtained by using the binomial expansion coefficient.

Also, presented in FIG. 2 is the phase shift introduced into each stave. Since only 10 staves are in operation at any one time the amount of phasing is determined by the relative distance 22 of each stave from a plane drawn tangent to the center of the ten stave section.

Figure 3:
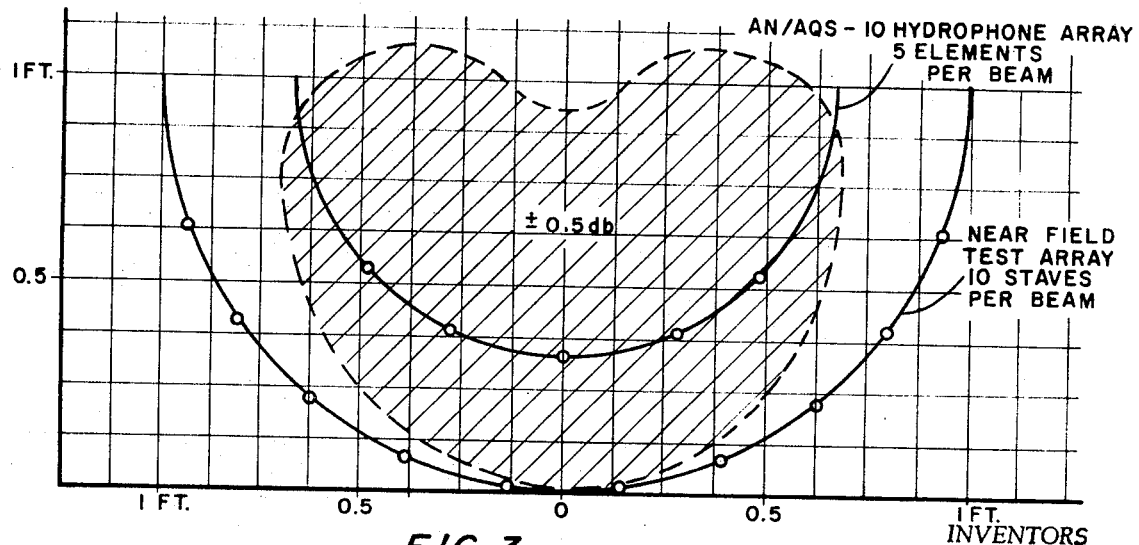
FIG. 3 illustrates the constant pressure volume produced by a 10 element section of a 24 stave cylindrical array.

The resulting cylindrical array exhibits a response similar to that of a comparable near-field planar array. The acoustic field developed by a 10 stave section of the array is plotted as a pressure contour variation in FIG. 3. By inspection of this figure, it is apparent that a sufficient plane wave volume is present to enclose the sensitive receiving aperture of the AN/AQS-10 hydrophone and therefore a far field effect is obtained in the near-field region.

The test array is used in conjunction with a conventional "tank" in which a particular sonar system to be tested is placed, thereby providing an overall test tank system.

To test the AN/AQS-10 sonar system a cylindrical test tank is fabricated from 0.25 inch steel. The tank is constructed with a diameter sufficient to provide a clearance between the tank walls and the cylindrical array of approximately 8 inches. The interior surface of the test tank is lined with sound absorbing rubber (SAPERT), approximately 0.28 inches thick, which is cemented to the tank. This results in a moderate reduction in the intensity of the acoustic reflection.

OPERATION

To a test a sonar system, a receiving hydrophone is placed inside the cylindrical test array as previously described. The test array is driven with a transmit signal generated by a test set. A hydrophone output signal is returned through the test set and is metered. By calibrating the system before testing, comparative results of the sonar minimum detectable signal level (MDS) and receiving beam to beam uniformity will be indicated on a test set meter.

As discussed previously, with respect to the test array for testing the AN/AQS-10 sonar system, a set of 10 staves of the 24 stave cylindrical test array are in operation at any one time. The spacing of the test staves about the AN/AQS-10 hydrophone is such that a receiver signal level may be monitored every 15° by switching the 10 stave section one stave at a time about the array. Uniformity among beams thus can be compared as well as discreet representation of the far field beam pattern.

Minimum detactable signal (MDS) level for each receiving beam can be determined by utilization of a transmit signal attenuator. MDS is that level producing a three DB increase over the level produced by noise with the transmit attenuator at its maximum position. By adjusting the signal level which is transmitted by the test staves until it is equal to the background noise inherent to the beam under test, an accurate measure of this system parameter can be made.

Similarly by reciprocity a sonar transmitter response can be monitored at the various power levels of the sonar projector in the same manner as the receiving response. The transmitting beam pattern can thus be monitored every 15°. A measure of the transmitted power output of the sonar under test is made by monitoring the signal level received by the test array and compensating for the gains and losses through the system.

System range and bearing accuracy can be checked by injecting a signal, which is keyed to the sonar transmitter, every 15° and at every range scale. This is accomplished by transmitting a 3.5 or 35 millisecond pulse, the repetition rate of which is determined by the range scale selected on the sonar system control set. Target range is simulated by introducing a variably adjustable delay in the transmit pulse. The delay simulates the two-way travel time of a pulse in the water. No power is delivered to the sonar projector when a simulated target is being used.

Sonar system performance test data can also be obtained through operation of a single test stave. The function of the single stave test is identical to that of a multiple stave system to check out the operational performance of a sonar system. Because of the nature of this system, it is capable of performing this function with a reduction in test system complexity (e.g. elimination of delay lines, several preamplifiers, switches, etc.).

Beam uniformity, minimum detectable signal, transmitter response and range and bearing accuracy tests are performed in the same manner as with the multiple stave test system except only one stave at a time is energized. The tests are performed by simply switching one stave at a time around the array. The acoustic field produced, instead of being a plane wave, is essentially a cylindrical wave. The cylindrical wave is due to the vertical shading inherent in the stave, is constant in pressure and phase in the vertical dimension, but possesses a distinct curvature in the horizontal dimension. Thus, though the single stave system results in reduced test system complexity, a sacrafice results from the consequent loss in the absolute indication of system performance.

Thus the present invention provides an array which accurately simulates far field conditions in the near field. The cylindrical array provides a constant pressure near field which can be used to test the operational characteristics of a sonar system.

Obviously many modifications and variations of the present invention are possible in light of the above teachings. The invention is in no way limited by the embodiment and functions described, which were given merely by way of example. It is therefore to be understood that within the scope of the appended claims the invention may be practiced otherwise than as specifically described.

What is claimed is:

1. An electroacoustic transducer array for testing a sonar system comprising:
   a plurality of staves;
   a plurality of transducer elements within each stave;
   each of said staves containing the same number of transducers and the transducers within each stave being spaced the same distance apart;
   said plurality of staves arranged on a circle of predetermined diameter such that the transducers are aligned and equally spaced both vertically and circumferentially whereby the cylindrical array is acoustically transparent at the operating frequency; and
   means for shading each of said transducers whereby the cylindrical array has a constant pressure volume near-field.

2. The electroacoustic transudcer array of claim 1 wherein said transducers are electrically coupled in parallel.

3. The electroacoustic transducer array of claim 2 wherein said transducers are ceramic cylinders of a preselected size.

4. The electroacoustic transducer array of claim 1 wherein each stave comprises a sealed, hollow neoprene tube containing oil.

5. The electroacoustic transducer array of claim 1 wherein said shading means includes a capacitor electrically coupled in series with each transducer.

6. The electroacoustic transducer array of claim 2 wherein the cylindrical array comprises:
   24 staves arranged on a circle of approximately 25 inches in diameter;
   said staves contain nineteen transducer elements spaced 4 inches apart; and
   said transducer elements consist of ½ inch by ¼ inch ceramic cylinders.

* * * * *